United States Patent
Franchet et al.

(10) Patent No.: US 8,166,910 B2
(45) Date of Patent: May 1, 2012

(54) PROCESS AND DEVICE FOR COATING FIBERS WITH A METAL BY A LIQUID METHOD

(75) Inventors: Jean-Michel Patrick Maurice Franchet, Paris (FR); Gilles Charles Casimir Klein, Mery sur Oise (FR); Christian Garnier, Eybens (FR); Patrick Petitpas, Drumettaz (FR); Pierre Eric Frayssines, Fontaine (FR); Mikael Dumont, Grenoble (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 12/980,942

(22) Filed: Dec. 29, 2010

(65) Prior Publication Data

US 2011/0088618 A1    Apr. 21, 2011

Related U.S. Application Data

(62) Division of application No. 12/124,562, filed on May 21, 2008, now Pat. No. 8,084,099.

(30) Foreign Application Priority Data

May 22, 2007   (FR) ...................................... 07 03634

(51) Int. Cl.
    *B05C 3/12*    (2006.01)

(52) U.S. Cl. ......... 118/420; 118/419; 118/423; 118/429
(58) Field of Classification Search ............... 427/430.1, 427/435, 436, 434.2, 434.6; 118/420, 419, 118/426
See application file for complete search history.

(56) References Cited

U.S. PATENT DOCUMENTS

| | | | | |
|---|---|---|---|---|
| 2,779,510 | A * | 1/1957 | Wilson et al. | 406/75 |
| 4,095,643 | A * | 6/1978 | Farlow et al. | 164/301 |
| 6,174,570 | B1 * | 1/2001 | Dambrine et al. | 427/434.7 |
| 7,687,114 | B2 | 3/2010 | Franchet et al. | |
| 2004/0161629 | A1 * | 8/2004 | McDevitt | 428/653 |

FOREIGN PATENT DOCUMENTS

| | | |
|---|---|---|
| EP | 0 931 846 A1 | 7/1999 |
| JP | 53-114734 | 10/1978 |
| JP | 01-177346 | 7/1989 |

* cited by examiner

*Primary Examiner* — David Turocy
(74) *Attorney, Agent, or Firm* — Oblon, Spivak, McClelland, Maier & Neustadt, L.L.P.

(57) ABSTRACT

A device used for a process of coating fibers with a metal by a liquid method is disclosed. In this process, a fiber is drawn through a bath of molten liquid metal so as to be coated with the molten liquid metal. The liquid metal bath is maintained in a crucible of the "levitation" type, which at least partly eliminates contact between the liquid metal and the crucible. The bath is fed with metal, during the process, by a metal powder.

4 Claims, 2 Drawing Sheets

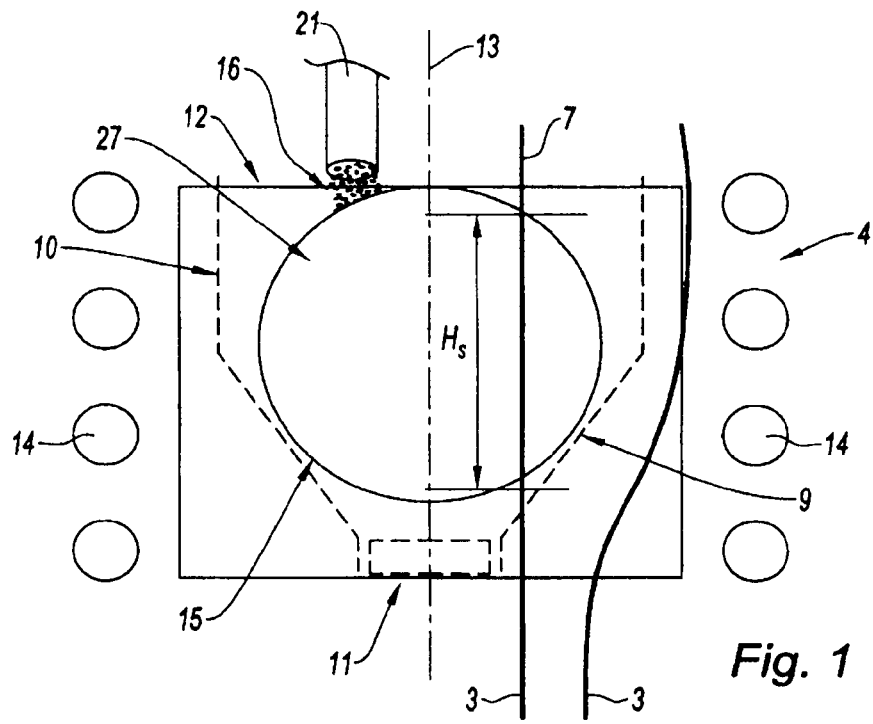
Fig. 1
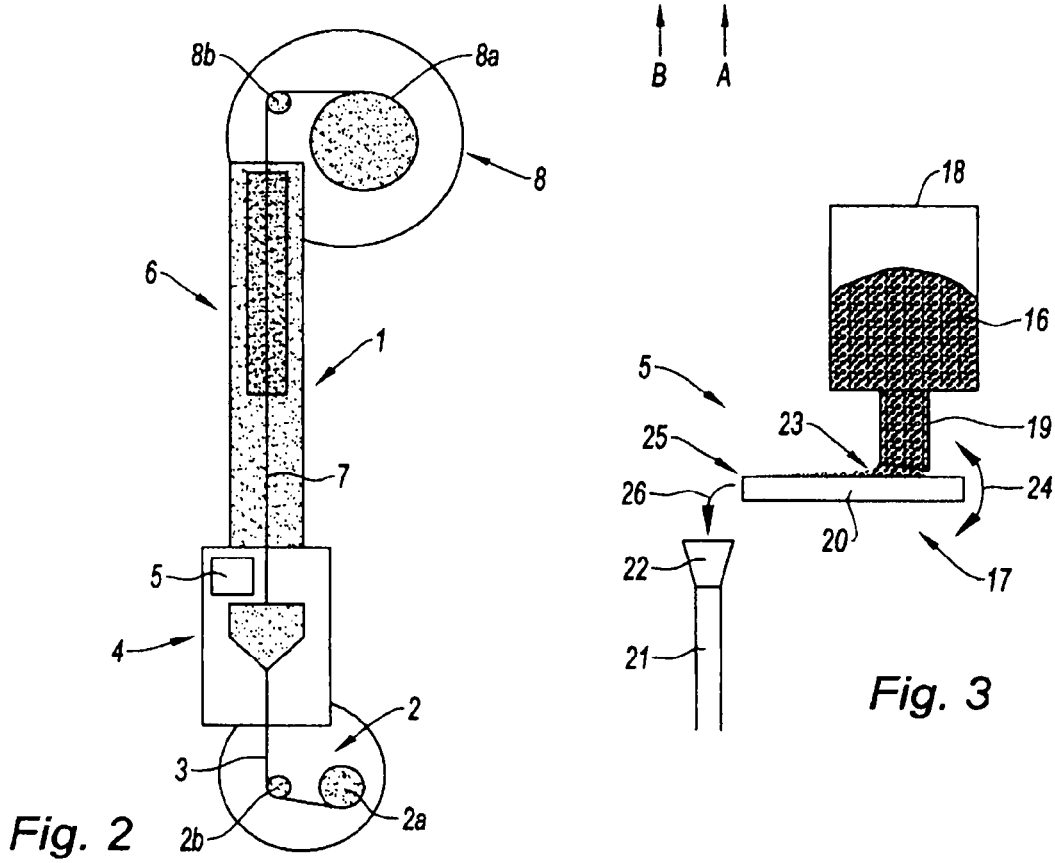
Fig. 2
Fig. 3

PROCESS AND DEVICE FOR COATING FIBERS WITH A METAL BY A LIQUID METHOD

CROSS-REFERENCE TO RELATED APPLICATIONS

This application is a division of U.S. application Ser. No. 12/124,562 filed May 21, 2008 now U.S. Pat. No. 8,084,099, the entire contents of which is incorporated herein by reference. Application Ser. No. 12/124,562 is based upon and claims the benefit of priority from prior French Patent Application No. 07 03634 filed May 22, 2007.

BACKGROUND OF THE INVENTION

The invention relates to a process and a device for coating fibers with a metal by a liquid method.

DESCRIPTION OF THE PRIOR ART

In the aeronautical field in particular, a constant objective is to optimize the strength of parts for a minimal mass and minimal size. Thus certain parts may now include an insert made of a metal matrix composite. Such a composite comprises a metal alloy matrix, for example a titanium (Ti) alloy matrix, in which fibers, for example silicon carbide (SiC) ceramic fibers, extend. Such fibers have a tensile strength much higher than that of titanium (typically, 4000 MPa compared to 1000 MPa) and a stiffness typically three times higher. It is therefore the fibers that take up the loads, the metal alloy matrix ensuring load transfer between the fibers, and providing a binder function with the rest of the part and a function of protecting and separating the fibers, which must not come into contact with one another. Furthermore, the ceramic fibers are strong, but brittle and necessarily have to be protected with metal.

These composites can be used in the manufacture of disks, shafts, actuator bodies, casings, spacers, as reinforcements for monolithic parts, such as blades, etc. They may also be applicable in other fields in which a volume force field is applied to a part, for example a pressure envelope such as a bush or a pressurized fluid reservoir.

To obtain such a composite insert, wires called "coated wires", comprising a reinforcement formed from a ceramic fiber coated with a metal sheath, are formed beforehand. The metal coating gives the wire a greater stiffness but also better toughness which proves useful when handling it. The manufacture of composite wires, or coated wires, may be carried out in various ways, for example by metal vapor deposition on the fiber in an electric field, by electrophoresis using a metal powder, or else by dip-coating the fibers in a bath of liquid metal.

A dip-coating process for coating fibers in a bath of molten liquid metal is presented in patent EP 0 931 846 in the name of the Applicant. In the process of patent EP 0 931 846, the molten liquid metal is kept in levitation in a suitable crucible, so as to at least partly eliminate contact with the walls of the crucible, at an appropriate temperature. The levitation is obtained using electromagnetic means surrounding the crucible. The ceramic fiber, kept under tension by seizure means, is drawn through the metal bath. The rate at which the fiber passes through the metal bath is set according to the desired thickness of metal on the fiber.

One parameter having a strong influence on the quality of the metal coating is the source height. The source height is defined as the instantaneous height of fiber immersed in the liquid metal bath, that is to say the height of the liquid metal ball through which the fiber runs. The more constant the source height remains during the process, the better is the quality of the coating. However, as the coating proceeds, the mass of metal in the levitated ball, and therefore its volume, decreases, resulting in a reduction in the source height at the place where the fiber runs. Thus, the quality of the coating will be acceptable only up to a threshold length of coated wire formed, the continuation of the coating beyond this length being reflected in a coating with too small a thickness. Moreover, and in any case, even below this threshold length, the coating is unsatisfactory since its thickness decreases along the wire.

Thus, for a coated metal thickness of around 10 microns, the coating must be interrupted after a few hundred meters of coated wire. For a coated metal thickness of around fifty microns, the coating must be interrupted after a few tens of meters of coated wire. A metal coating process cannot therefore be implemented as an industrial process.

A solution to this problem is presented in document EP 0 931 846, which consists in feeding the molten bath with a metal bar introduced via the bottom of the crucible, which is moved translationally upward. However, this process is not entirely satisfactory since the molten ball is not very stable thermally because of the proximity of the bar and the amount of mass fed per unit time is not easy to regulate. Moreover, the device presented can only be operated with a fiber stretched horizontally, which may be constricting.

The invention aims to provide an alternative solution to the problem of feeding the molten metal bath in a process for coating fibers with a metal by a liquid method.

SUMMARY OF THE INVENTION

For this purpose, the invention relates to a process of coating a fiber with a metal by a liquid method, in which a fiber is drawn through a bath of molten liquid metal so as to be coated with the latter, the liquid metal bath being maintained in a crucible of the "levitation" type, which at least partly eliminates contact between the liquid metal and the crucible, wherein the bath is fed with metal, during the process, by a metal powder.

Thanks to the invention, the molten metal bath is fed simply and effectively. The bath may be maintained at its initial mass over a very long time, allowing several kilometers of wire to be coated. The process of the invention therefore allows the coating of wires by a liquid method to be implemented on an industrial scale, thanks to greatly increased productivity.

According to one embodiment, the metal powder is poured into the bath via a vibrating plate.

The use of such a vibrating plate allows the flow rate of powder and the homogeneity of its distribution to be very precisely controlled. Thus, the source height, i.e. the length of fiber immersed in the bath, is constant, thereby enabling quality coating to be achieved. In particular, the coating of ceramic fibers, which requires this source height to be strictly respected, may be implemented in an industrial manner.

According to one embodiment, when the plate is supplied with powder via a powder reservoir, the flow rate of powder poured into the bath is regulated by the height between the reservoir and the plate and by the vibration frequency of the plate.

Regulating the flow rate by the height between the reservoir and the plate and by the frequency of the plate allows very fine control of this flow rate and therefore guarantees that the source height is constant.

According to one embodiment, the powder feed is continuous during the process.

According to one embodiment, the molten bath is fed in a plurality of powder supply zones.

According to one embodiment, the bath is fed by gravity.

According to one embodiment, the fiber is a ceramic fiber, for example a silicon carbide fiber.

According to one embodiment, the metal is a titanium alloy.

The invention also relates to a device for coating fibers with a metal by a liquid method, for implementing a process of coating fibers with metal, for example ceramic fibers, by a liquid method, in which a fiber is drawn through a bath of molten liquid metal, for example a titanium alloy, in order to be coated with the latter, the liquid metal bath being maintained in a crucible of the "levitation" type, which at least partly eliminates contact between the liquid metal and the crucible, comprising a feed module for feeding metal powder into the molten liquid metal bath.

The device has the same advantages as the process presented above.

According to one embodiment, the powder feed module comprises at least one powder dispenser having a vibrating plate for pouring the metal powder into the bath.

According to one embodiment, the powder dispenser comprises at least one reservoir for feeding the plate with powder.

According to one embodiment, the powder dispenser feeds a plurality of powder supply zones in the molten bath.

According to one embodiment, the powder dispenser comprises a powder reservoir and a tube for feeding the vibrating plate, the plate being designed to pour the powder into a tube supplying powder by gravity into the metal bath.

According to one embodiment, the powder feed module comprises a plurality of powder dispensers.

According to one embodiment, the device comprises a fiber pay-out module, a fiber coating module, which includes the crucible, and a fiber take-up module.

BRIEF DESCRIPTION OF THE DRAWINGS

The invention will be more clearly understood with the aid of the following description of the preferred embodiment of the process and of the device of the invention, with reference to the appended plates of drawings, in which:

FIG. 1 shows a schematic cross-sectional view of the crucible of the device of the invention;

FIG. 2 shows a schematic side view of the device of the invention;

FIG. 3 shows a schematic side view of the powder feed module of the device of the invention;

Figure 4:
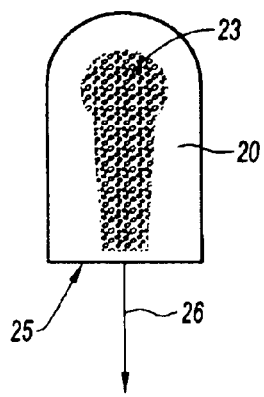
FIG. 4 shows a top view of a first embodiment of the vibrating plate of the powder feed module of the device of the invention.

DESCRIPTION OF THE PREFERRED
EMBODIMENTS

The invention is described in relation to the formation of a coated wire comprising a silicon carbide ceramic fiber shrouded in a sheath of a titanium alloy. Preferably, and conventionally, a very thin carbon or tungsten wire is at the center of the fiber, along its axis, this carbon or tungsten wire being coated with silicon carbide, while a thin layer of carbon or pyrocarbon coats the silicon carbide and therefore is interposed between the fiber and the metal, so as to provide a diffusion barrier function, to protect the fiber against notch effects and to provide a buffer function during the differential thermal expansion that occurs as the liquid metal deposited on the fiber cools.

Referring to FIG. 2, the device 1 for coating fibers with a metal by a liquid method according to the invention comprises a pay-out module 2, here for paying out a silicon carbide ceramic fiber 3, a liquid metal coating module 4, a module 5 for feeding the coating module 4 with metal powder, a cooling module 6, for cooling the coated wire 7 formed, and a take-up module 8, here for winding up the coated wire 7.

The pay-out module 2 comprises a reel 2a on which the ceramic fiber 3 is wound, said fiber being paid out via a first guide pulley 2b and a second guide pulley 8b, to a reel 8a of the take-up module 8. The fiber 3 is tensioned between the two reels 2a, 8a and runs, approximately rectilinearly, between the two guide pulleys 2b, 8b. In this rectilinear portion, the fiber 3 passes through the coating module 4.

Referring to FIG. 1, the coating module 4 comprises a crucible 9 of the "levitation" type. Such a crucible 9 has walls 10 that extend between a first opening 11, through which the fiber 3 enters, and a second opening 12, through which the fiber 3 leaves. The crucible 9 generally has symmetry of revolution about an axis 13, which is here parallel to the axis along which the fiber 3 runs between the two guide pulleys 2b, 8b. The walls 10 of the crucible 9 include at least one longitudinal slot (not shown) that allows the fiber 3 to pass from outside the crucible 9 into the crucible 9.

The coating module 4 also includes an electromagnetic inductor with a plurality of turns 14 designed to generate a magnetic field in the volume of the crucible 9 and enabling a molten metal ball 15 to be kept levitated in the volume of the crucible 9, in a known manner. Here, the metal is a titanium alloy. When the metal is in levitation, contact with the walls 10 of the crucible 9 is at least partly eliminated.

In FIG. 1, the ceramic fiber 3 is shown in two positions, denoted by A and B. In position A, the fiber 3 runs in a non-rectilinear manner so as to go around the crucible 9. The fiber 3 then runs to the outside of the volume of the crucible 9, between the walls 10 of the crucible 9 and the turns 14 of the inductor. In this position, which is a rest or standby position, the ceramic fiber 3 is not in contact with the molten metal 15.

In position B, the fiber 3 lies within the volume of molten metal 15. The fiber 3 is moved from position A to position B through the slot, mentioned above, provided for this purpose in the walls 10 of the crucible. The movement from position A to position B may be initiated by any appropriate means, for example using a retractable pulley. In position B, the fiber 3 is paid out from the pay-out module 2 to the take-up module 8 through the charge of molten liquid metal 15. The fiber 3 is then coated with the metal and emerges from the metal bath 15 on the outlet opening side 12 of the crucible 9, in the form of a coated wire 7. The latter is cooled in the cooling module 6.

The coating device 1 also includes, as mentioned above, a powder feed module 5 for supplying metal powder to the molten metal bath 15. The fact of feeding the bath 15 with powder makes it possible to maintain a source height, defined above and denoted in FIG. 1 by the height $H_s$, which is as constant as possible. Specifically, the powder flow rate is regulated in such a way as to make up for the reduction in mass of the molten metal ball 15 due to the fiber 3 being coated with metal. In the embodiment shown, the powder 16 consists of the same metal as the metal present in the molten metal bath, in this case a titanium alloy.

The powder supply 16 allows the metal bath 15 to be fed easily and effectively. In particular, the flow rate of the feed may be regulated according to the coating speed of the fiber 3. Moreover, since the powder 16 is in the form of a plurality of small particles, its "digestion" by the bath 15 is facilitated. The term "digestion" of the powder 16 by the bath 15 should be understood to mean the action whereby the bath incorporates the powder into itself and melts it so as to form a homogenous assembly; in other words, it refers to the conversion of the solid metal particles of the powder into molten metal. The digestion is facilitated by the electromagnetic stirring of the levitated metal charge 15, which stirring drags the powder toward the interior of this charge 15, facilitates its melting and homogenizes the assembly.

In order for the coating process to be of high quality, it is important that the zone of the bath through which the ceramic fiber 3 runs, so as to be coated with metal, be a zone in which there is only molten metal and not metal in powder form. It is therefore necessary to ensure that the powder 16 has correctly melted in the zone in question.

Thus, if the powder flow rate 16 is too high, the metal particles agglomerate in the liquid bath, which retards the melting, and may adhere, without having been melted, to the fiber 3, which would be deleterious to the quality of the coated wire 7. In contrast, if the powder flow rate 16 is too low, the mass of metal decreases progressively as the metal is coated onto the fiber 3 and as the source height $H_s$ decreases.

Referring to FIGS. 3 and 4, the feed module 5 comprises here a powder dispenser 17, comprising a powder reservoir 18, a tube 19 for feeding a vibrating plate 20 and a tube 21, having a funnel 22, for supplying the powder 16 by gravity from the plate 20 into the metal bath 15. The powder dispenser 17 may be under a vacuum or in an inert atmosphere.

The powder 16, contained in the reservoir 18, can flow freely in the feed tube 19 onto the plate 20, where it forms a small mound 23. The plate 20 is vibrated, as indicated by the arrow 24, which causes the powder 16 to run from the mound 23 to the end 25 of the plate located above the funnel 22. As indicated by the arrow 26, the powder 16 then drops under gravity into the funnel 22 and therefore into the feed tube 21, which conducts it by gravity to a zone 27 of the bath 15 for receiving and absorbing the powder 16, as may be seen in FIG. 1. This zone 27 will also be referred to hereafter as a powder supply zone 27 for supplying powder 16 into the bath 15. The powder 16 is ingested by the bath 15 and melted. The tube 21 for supplying the powder 16 into the molten bath 15 comprises, at least at its end close to the bath 15, a coating forming a heat shield, for protecting it from the heat coming from the bath 15. This zone located close to the bath 15 may form (or comprise) a feed nozzle, for example of frustoconical shape.

The flow rate with which the bath is fed with powder 16 is regulated, in particular thanks to the height between the end of the tube 19 for feeding the plate 20 via the reservoir 18 and the plate 20, to the frequency and amplitude of vibration of the plate 20, to the angle that the plate 20 makes with the horizontal and to the particle size of the powder 16. As regards the height between the end of the feed tube 19 and the plate 20, this allows the height of the mound 23 to be regulated, which has an influence on the flow rate as, the larger the mound, the higher the flow rate may be, since a larger mass of metal may be fed at the other end 25 of the plate 20. As regards the frequency and amplitude of vibration of the plate 20 and the angle that the latter makes with the horizontal, the higher these are, the higher the flow rate. Finally, as regards the particle size of the powder 16, the larger this is, the less easy it is to move the powder 16 by vibration and therefore the lower the flow rate.

Figure 6:
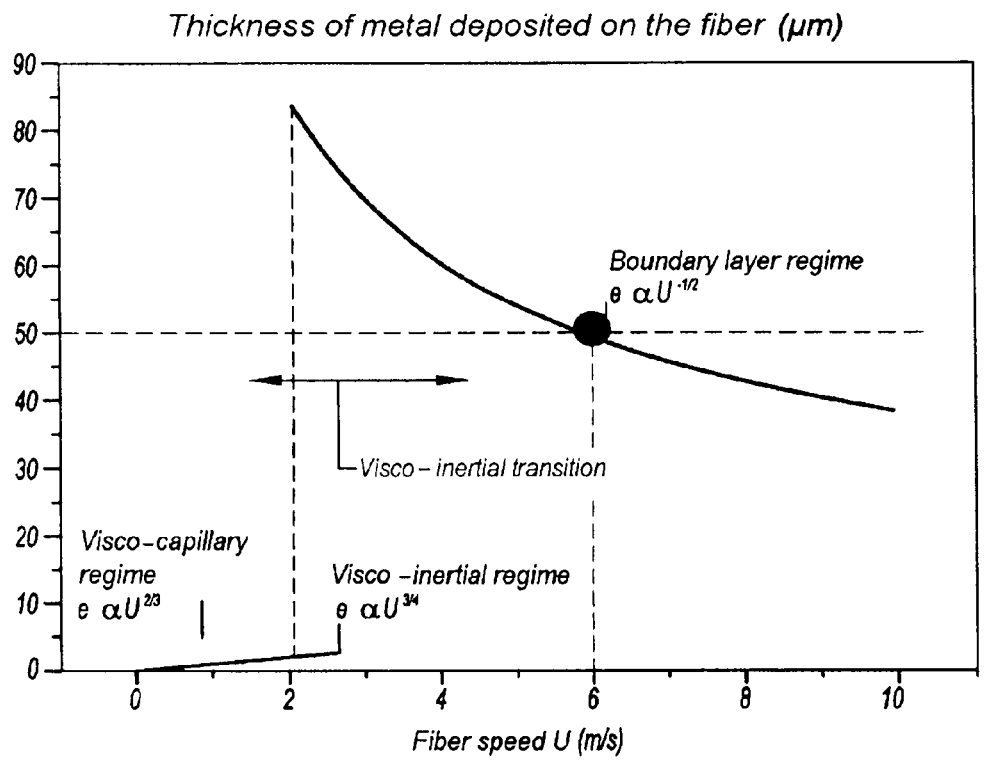
FIG. 6 is a diagram showing the variation in the thickness of metal deposited on a fiber as a function of the run speed of the fiber through a bath of said molten liquid metal.

Incidentally, it should be noted, with reference to FIG. 6, that the influence of the run speed of the ceramic fiber 3 on the thickness of metal deposited on the fiber 3 is not linear. This influence will not be explained in detail here, a person skilled in the art being able to refer to the diagram of FIG. 6, which shows well-known curves of the relationship between the coated thickness and the speed, depending on the boundary layer regime (visco-capillary or visco-inertial) in which this lies, said regime being determined by the speed of the fiber 3. In general, it should be noted that in a range of low speeds the coated thickness increases with the speed, while within a range of high speeds the coated thickness decreases with the speed.

To give an example, for a fiber run speed of 3 m/s, the powder flow rate may be equal to about 1 g/s for a powder 16 having particles with a diameter of about 125 μm. This allows about 70 μm of metal to be coated on the fiber 3. These values are given merely by way of example, other values being of course conceivable.

If, as shown in FIG. 1, the fiber 3 runs not along the center but on one side of the molten metal ball 15, the powder 16 is preferably supplied on the other side of the ball 15, the distance between the zone 27 for supplying the powder 16 and the fiber 3 allowing the fiber 16 to have more time to melt before coming into contact with the fiber 3. Thus, a higher flow rate of powder 16 may be envisioned.

Moreover, for better homogenization of the molten metal bath 15, a plurality of powder supply zones 27 may be provided in the molten metal bath 15, thereby allowing the supply of powder 16 to be distributed over a larger area of the liquid bath 15. For this purpose, the powder feed module 5 for supplying powder 16 may comprise a plurality of powder dispensers, for example in accordance with the dispenser 17 described above. Moreover, the feed module 5 may comprise one or more dispensers each feeding a plurality of zones 27 for supplying powder 16 in the bath 15.

Figure 5:
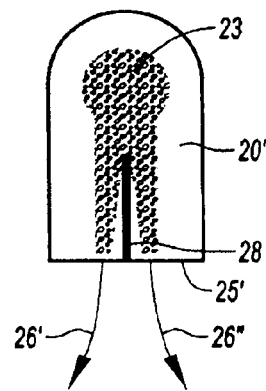
FIG. 5 shows a top view of a second embodiment of the vibrating plate of the powder feed module of the device of the invention.

FIG. 5 shows a vibrating plate 20' for implementing a dispenser in accordance with the latter embodiment. The plate 20' comprises, as previously, a zone in which a powder mound 23' is formed. The plate 20' also comprises, starting from its end 25' for feeding a funnel, a partition 28 for separating the powder flow 26 into two paths, thereby allowing the powder 16 to be supplied into two different feed tubes (not shown), as indicated by the arrows 26', 26". These two feed tubes allow the powder 16 to be fed into two different zones 27 for supplying powder 16 in the molten bath 15.

It goes without saying that various embodiments of the invention (which are not described) are possible. For example, the fiber 3 may be paid out at the center of the molten metal ball 15, the powder being supplied in a plurality of zones 27 located around the fiber 3, and preferably symmetrical about the latter.

Moreover, the process and the device of the invention have been presented in relation to the powder 16 being fed by gravity, but it goes without saying that it could be supplied under pressure.

The fiber 3 does not necessarily run vertically—in particular, it may run horizontally. Moreover, the powder 16 is not necessarily supplied via the outlet opening for the fiber 3 but may be supplied laterally with respect to the fiber 3.

The invention claimed is:

1. A device for coating fibers with a metal by a liquid method, for implementing a process of coating fibers with metal by a liquid method, in which a fiber is drawn through a bath of molten liquid metal in order to be coated with the molten liquid metal, the liquid metal bath being maintained in a crucible of the "levitation" type, which at least partly eliminates contact between the liquid metal and the crucible, the device comprising:
- a feed module for feeding metal powder into the molten liquid metal bath, the feed module including a powder reservoir, a vibrating plate, a first tube which supplies the metal powder from the powder reservoir to a first end of the vibrating plate, and a second tube disposed below and spaced apart from a second end of the vibrating plate which supplies the metal powder from the vibrating plate to the bath by gravity,
- wherein the vibrating plate vibrates with respect to a horizontal such that the metal powder moves from the first end of the vibrating plate to the second tube disposed below and spaced apart from the second end of the vibrating plate, and
- wherein the vibrating plate includes a partition which separates the metal powder fed to the bath into two paths.

2. The device as claimed in claim 1, comprising a fiber pay out module, a fiber coating module, which includes the crucible, and a fiber take up module.

3. The device as claimed in claim 1, a funnel is provided at a first end of the second tube closer to the vibrating plate.

4. The device as claimed in claim 1, wherein a second end of the second tube closer to the bath includes a coating forming a heat shield.

* * * * *